Figure 1:
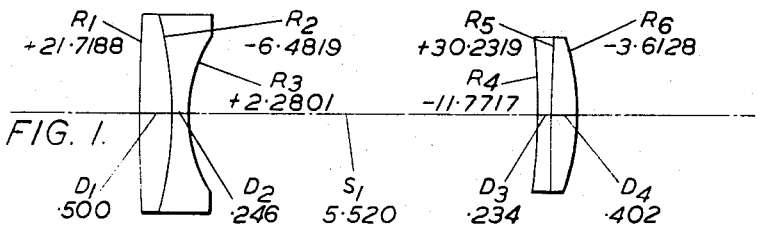

Jan. 28, 1958     G. H. COOK     2,821,110

ANAMORPHOTIC ATTACHMENTS FOR OPTICAL OBJECTIVES

Filed June 4, 1954     2 Sheets-Sheet 1

Inventor
GORDON H. COOK
By Holcombe, Wetherill & Brunbois
Attorneys

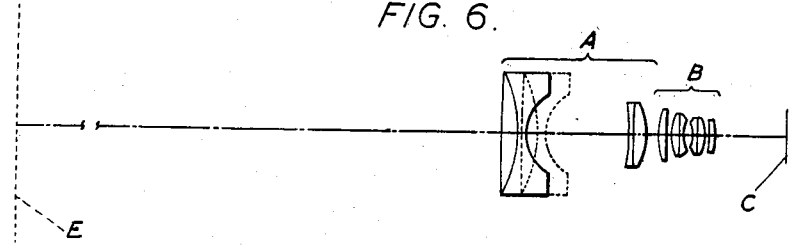
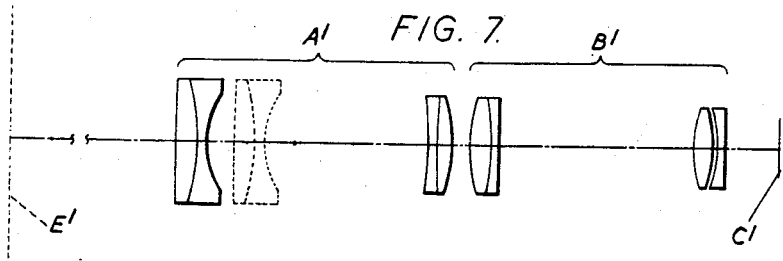
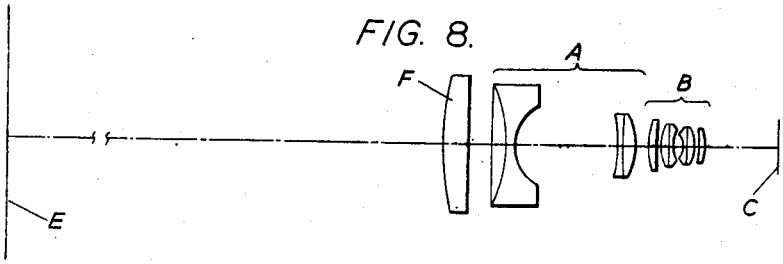
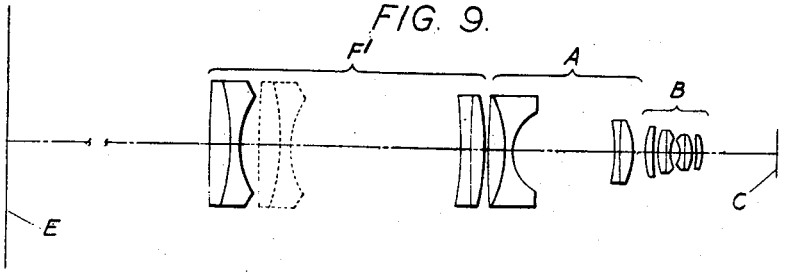

United States Patent Office

2,821,110
ANAMORPHOTIC ATTACHMENTS FOR OPTICAL OBJECTIVES

Gordon Henry Cook, Leicester, England, assignor to Taylor, Taylor & Hobson Limited, Leicester, England, a company of Great Britain Application June 4, 1954, Serial No. 434,570

Claims priority, application Great Britain June 10, 1953

14 Claims. (Cl. 88—57)

This invention relates to an anamorphotic attachment for an optical objective, primarily (though not exclusively) intended for use in a wide screen cinematographic reproduction system.

The usual aspect ratio of the picture frame on cinematograph film, and similarly also of the picture area on the projection screen, is 4:3, but it is frequently desired to use an aspect ratio of, say, 8:3, not merely for the purpose of reproducing a panoramic view, but also because the wide angle of view at the eye when viewing a wide projection screen provides an apparent stereoscopic effect. It is not practicable with present-day equipment to produce this result merely by halving the height of the picture frame on normal film, chiefly in view of the inadequacy of illumination on the screen, and the practical difficulties involved in the use of double-width film with the normal picture-frame height render that possible solution of the problem unsatisfactory. It has accordingly been proposed to use an anamorphotic optical system to effect lateral compression of a wide scene so that it can be photographed on to normal film with a normal picture frame area, and to use a similar anamorphotic system in the projector to broaden the picture back to its original proportions on a wide projection screen.

The present invention has for its primary object to provide an improved anamorphotic attachment which can be used in front of an ordinary photographic or projection objective to enable such a wide screen cinematographic reproduction system to be effectively and satisfactorily carried into practice.

The anamorphotic attachment for an optical objective, according to the present invention, is corrected for spherical and chromatic aberrations, coma and tangential curvature, and comprises two doublets having all their surfaces cylindrical with parallel generatrices, the conditions in the plane transverse to such generatrices being such that the rear doublet (that is the doublet nearer to the main objective) is convergent and the front doublet divergent, the separation between the adjacent nodal points of the two doublets being not greater than $\Delta$ and not less than $(\Delta-.15f_2)$, whilst the rear surface of the rear doublet is concave to the front with radius of curvature between $\Delta$ and $.4\Delta$ and the rear surface of the front doublet is convex to the front with radius of curvature between $.15f_1$ and $.6f_1$, where $f_1$ and $f_2$ are the positive values of the equivalent focal lengths respectively of the front doublet and of the rear doublet and $\Delta$ is the difference between $f_1$ and $f_2$.

It should be made clear that the terms "front" and "rear" as applied herein to the attachment are used in the same senses as for the main objective, in front of which the attachment is located, the "front" being the side of the main objective nearer to the longer conjugate and the "rear" the side of the objective remote therefrom, in accordance with the usual convention, so that in the case of a photographic objective the light passes through it from front to rear, whilst in the case of a projection objective the light passes through it from rear to front.

Preferably, each doublet consists of a convergent element and a divergent element, the convergent element in the convergent doublet being behind the associated divergent element, whilst that in the divergent doublet is in front of the associated divergent element. In the convergent doublet, the mean refractive index of the material of the divergent element conveniently exceeds that of the convergent element by less than .22. In the divergent doublet, the mean refractive index of the material of the convergent element conveniently exceeds that of the divergent element by between .07 and .22. The radius of curvature of the internal contact surface in the divergent doublet preferably lies between $\infty$ and $.7f_1$ concave to the front.

The separation between the adjacent nodal points of the two doublets is preferably for operative systems substantially equal to $$\frac{D}{2(D+f_2)} \times [D+2f_2-\sqrt{D^2+4f_1D+4f_1f_2}]$$

where D is the long conjugate distance (that is the object distance in the case of an attachment for a photographic objective or the screen distance in the case of an attachment for a projection objective) as measured from the front nodal point of the rear doublet. It will be noticed that this expression for the separation reduces to $\Delta$ in the case of an infinite object distance.

It is often desirable to provide accommodation for different object distances or screen distances. In one such arrangement, the separation between the adjacent nodal points of the two doublets is fixed and substantially equal to $\Delta$, accommodation for near object distances or for short screen distances being afforded by providing in front of the attachment an additional lens whose focal length is approximately equal to the long conjugate distance measured from the front nodal point of the additional lens. Such additional lens may have fixed focal length and may be removable to permit substitution of another additional lens of different focal length to suit a different object distance or screen distance, or alternatively the additional lens may be arranged to have variable focal length, so that it can be adjusted to suit different object distances or screen distances. In an alternative arrangement, the separation between the adjacent nodal points of the two doublets is made variable to accommodate different object distances or screen distances.

Some convenient practical arrangements of anamorphotic attachment according to the invention are illustrated diagrammatically by way of example in the accompanying drawings, in which Figures 1–5 respectively show five examples of anamorphotic attachment in end elevation, that is as viewed in the direction of the generatrices of the cylindrical surfaces of the attachment.

Figure 2:
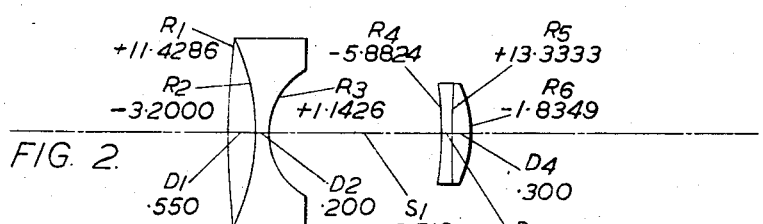
Figure 3:
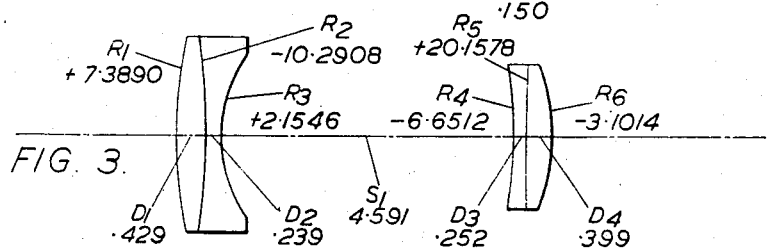
Figure 4:
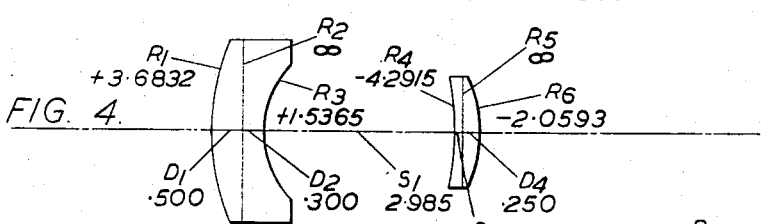
Figure 5:
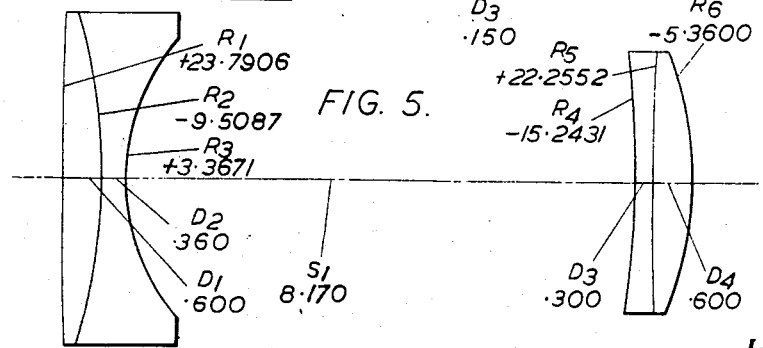

Figure 6 shows the anamorphotic attachment of Figure 2 located in front of a main objective, in this instance a photographic objective, Figure 7 shows the example of Figure 1 located, by way of variant, in front of a projection objective, and Figures 8 and 9 show the arrangement of Figure 6 modified to have a collimating lens in front of the anamorphotic attachment, the collimating lens of Figure 9 being of variable focal length.

Numerical data for the five examples of Figures 1–5 are given in the following tables, in which $R_1$, $R_2$ ... represent the radii of curvature of the cylindrical surfaces in the plane transverse to their generatrices, the positive sign indicating that the surface is convex to the front, and the negative sign that it is concave thereto, $D_1$, $D_2$ ... represent the axial thicknesses of the individual elements, and $S_1$ represents the axial air separation between the two doublets. The tables also give the mean refractive indices, for the d-line of the spectrum, and also the Abbé V numbers of the materials of the individual elements.

The insertion of equals (=) signs in the radius columns of the tables, in company with plus (+) and minus (—) signs which indicate whether the surface is convex or concave to the front, is for conformity with the usual Patent Office custom, and it is to be understood that these signs are not to be interpreted wholly in their mathematical significance. This sign convention agrees with the mathematical sign convention required for the computation of some of the aberrations including the primary aberrations, but different mathematical sign conventions are required for other purposes including computation of some of the secondary aberrations, so that a radius indicated for example as positive in the tables may have to be treated as negative for some calculations as is well understood in the art.

*Example I*

| Radius | Thickness or Air Separation | Refractive Index $n_d$ | Abbé V Number |
|---|---|---|---|
| $R_1=+21.7188$ | $D_1=.500$ | 1.6751 | 31.9 |
| $R_2=-6.4819$ | $D_2=.246$ | 1.5091 | 64.4 |
| $R_3=+2.2801$ | $S_1=5.520$ | | |
| $R_4=-11.7717$ | $D_3=.234$ | 1.6743 | 32.0 |
| $R_5=+30.2319$ | $D_4=.402$ | 1.5093 | 64.5 |
| $R_6=-3.6128$ | | | |

*Example II*

| Radius | Thickness or Air Separation | Refractive Index $n_d$ | Abbé V Number |
|---|---|---|---|
| $R_1=+11.4286$ | $D_1=.550$ | 1.6733 | 32.1 |
| $R_2=-3.2000$ | $D_2=.200$ | 1.5103 | 64.6 |
| $R_3=+1.1426$ | $S_1=2.716$ | | |
| $R_4=-5.8824$ | $D_3=.150$ | 1.6733 | 32.1 |
| $R_5=+13.3335$ | $D_4=.300$ | 1.5103 | 64.6 |
| $R_6=-1.8349$ | | | |

*Example III*

| Radius | Thickness or Air Separation | Refractive Index $n_d$ | Abbé V Number |
|---|---|---|---|
| $R_1=+7.3890$ | $D_1=.429$ | 1.6535 | 33.5 |
| $R_2=-10.2908$ | $D_2=.239$ | 1.5154 | 57.4 |
| $R_3=+2.1546$ | $S_1=4.591$ | | |
| $R_4=-6.6512$ | $D_3=.252$ | 1.6258 | 35.7 |
| $R_5=+20.1578$ | $D_4=.399$ | 1.5250 | 58.8 |
| $R_6=-3.1014$ | | | |

*Example IV*

| Radius | Thickness or Air Separation | Refractive Index $n_d$ | Abbé V Number |
|---|---|---|---|
| $R_1=+3.6832$ | $D_1=.500$ | 1.7169 | 29.4 |
| $R_2=\infty$ | $D_2=.300$ | 1.6120 | 44.9 |
| $R_3=+1.5365$ | $S_1=2.985$ | | |
| $R_4=-4.2915$ | $D_3=.150$ | 1.6205 | 36.2 |
| $R_5=\infty$ | $D_4=.250$ | 1.5076 | 61.2 |
| $R_6=-2.0593$ | | | |

*Example V*

| Radius | Thickness or Air Separation | Refractive Index $n_d$ | Abbé V Number |
|---|---|---|---|
| $R_1=+23.7906$ | $D_1=.600$ | 1.70035 | 30.3 |
| $R_2=-9.5087$ | $D_2=.360$ | 1.54065 | 59.5 |
| $R_3=+3.3671$ | $S_1=8.170$ | | |
| $R_4=-15.2431$ | $D_3=.300$ | 1.65348 | 33.5 |
| $R_5=+22.2552$ | $D_4=.600$ | 1.54065 | 59.5 |
| $R_6=-5.3600$ | | | |

In the first example, the dimensions are given with respect to an equivalent focal length $f_1$ for the front divergent member of 6.1, that of the rear convergent member $f_2$ being 12.2, so that the value of $\Delta$ is 6.1 and the telescopic power $f_2/f_1$ of the attachment is 2.0. The rear nodal point of the front member is .11 behind the rear surface $R_3$ of such member, and the front nodal point of the rear member is .69 behind the front surface $R_4$ of the rear member.

In the second example, the dimensions are given with respect to an equivalent focal length $f_1$ for the front divergent member of 3.1, that of the rear convergent member $f_2$ being 6.2, so that $\Delta$ is 3.1 and the telescopic power is again 2.0. The rear nodal point of the front member is .11 behind the surface $R_3$ and the front nodal point of the rear member is .49 behind the surface $R_4$.

In the third example, the dimensions are given with respect to an equivalent focal length $f_1$ for the front divergent member of 7.8, that of the rear convergent member $f_2$ being 13.0, so that $\Delta$ is 5.2 and the telescopic power is 1.67. The rear nodal point of the front member is .30 behind the surface $R_3$, and the front nodal point of the rear member is .91 behind the surface $R_4$.

In the fourth example, the dimensions are given with respect to an equivalent focal length $f_1$ for the front divergent member of 6.0, that of the rear convergent member $f_2$ being 9.0, so that $\Delta$ is 3.0 and the telescopic power is 1.5. The rear nodal point of the front member is .56 behind the surface $R_3$, and the front nodal point of the rear member is .57 behind the surface $R_4$.

In the fifth example, the dimensions are given with respect to an equivalent focal length $f_1$ for the front divergent member of 9.0, that of the rear convergent member $f_2$ being 18.0, so that $\Delta$ is 9.0 and the telescopic power is 2.0. The rear nodal point of the front member is .19 behind the surface $R_3$, and the front nodal point of the rear member is 1.02 behind the surface $R_4$.

The five examples are well-corrected for spherical and chromatic aberrations, coma and tangential curvature. The fourth example differs from the others primarily in that, in order to simplify manufacture, each of the four elements of the attachment has one surface plane, this manufacturing advantage being secured at the cost of a slight sacrifice in distortion correction and of a reduction in telescopic power from 2.0 to 1.5.

Figure 6 illustrates at A, by way of example, the anamorphotic attachment of Figure 2 located in front of a photographic objective B, whose rear focal plane is indicated at C. The position of the front member of the attachment A shown in full line is that to suit focussing on an infinitely distant object, whilst the dotted position is one suitable for focussing on an object at a finite distance, as indicated at E.

Figure 7 similarly illustrates at $A^1$ the anamorphotic attachment of Figure 1 located in this instance in front of a projection objective $B^1$, whose rear focal plane is indicated at $C^1$. Here again, the full line position of the front member of the anamorphotic attachment corresponds to an infinitely distant projection screen, whilst the dotted line position corresponds to a screen $E^1$ at a chosen finite distance.

The value given for $S_1$ in the foregoing tables is that to suit an infinitely distant object or screen, the separation between the adjacent nodal points of the two doublets being equal to $\Delta$. For focussing on an object or screen at a finite distance, the value of $S_1$ should be altered so that the separation between the two adjacent nodal points is $$\frac{D}{2(D+f_2)} \times [D+2f_2-\sqrt{D^2+4f_1D+4f_1f_2}]$$

where $D$ is the long conjugate distance (that is the object or screen distance) as measured (for convenience of calculation) from the front nodal point of the rear doublet. It will be noticed that, if $D=\infty$, this expression reduces to $(f_2-f_1)$, that is to $\Delta$.

Focussing for an object or screen at a finite distance can alternatively be effected, if desired, by utilising the value of $S_1$ given in the tables, so that the attachment is focussed for infinity, and placing in front of the anamorphotic attachment a collimating lens (having spherical surfaces), that is a lens so placed that the distance of the object or screen in front of its front nodal point is equal to its equivalent focal length. Such collimating lens can consist merely of a simple element, as shown for example at F in Figure 8, the remainder of the system being similar to that shown in Figure 6.

In cases where it is desired to make the anamorphotic attachment adjustable to suit different object or screen distances, this may be effected in various ways. For example, with the simple system of Figure 6 or Figure 7, the separation between the two doublets may be made variable, or with the arrangement of Figure 8 the collimating lens F may be made interchangeable with a set of alternative collimating lenses of different equivalent focal lengths, the anamorphotic attachment being maintained focussed for infinity. In a further alternative, illustrated in Figure 9, the collimating lens F is replaced by a more complex lens which can itself be adjusted to vary its equivalent focal length, the anamorphotic attachment again being maintained focussed for infinity. Such variable focus collimating lens may consist, as shown, of two doublet components whose separation is adjustable.

In these arrangements, the main objective B or B¹ will consist of a fully corrected objective of any of the well known constructions. Since the attachment is afocal, it is unimportant, as far as the axial beam is concerned, how far in front of the main objective it is placed, but in order to reduce oblique aberrations to a minimum and to secure a wide angle of view without vignetting, it is preferable to dispose the attachment as close as possible to the front of the main objective.

If the attachment is focussed for infinity, the main objective should also be focussed for infinity. If the attachment is focussed on an object at a finite distance or on a projection screen by appropriate choice of the separation between its two doublets, the main objective must likewise be focussed on the object or screen. If, however, accommodation for a finite object or screen distance is afforded by the use of a front collimating lens, it is necessary for the main objective to be focussed for infinity.

What I claim as my invention and desire to secure by Letters Patent is:

1. An anamorphotic attachment for an optical objective, corrected for spherical and chromatic aberrations, coma, and tangential curvature, and comprising two doublets having all their surfaces cylindrical with parallel generatrices, the conditions in the plane transverse to such generatrices being such that the rear doublet (that is the doublet nearer to the main objective) is convergent and the front doublet divergent, the separation between the adjacent nodal points of the two doublets being not greater than $\Delta$ and not less than $(\Delta-.15f_2)$, whilst the rear surface of the rear doublet is concave to the front with radius of curvature between $\Delta$ and $.4\Delta$ and the rear surface of the front doublet is convex to the front with radius of curvature between $.15f_1$ and $.6f_1$, where $f_1$ and $f_2$ are the positive values of the equivalent focal lengths respectively of the front doublet and of the rear doublet and $\Delta$ is the difference between $f_1$ and $f_2$.

2. An anamorphotic attachment as claimed in claim 1, in which each doublet consists of a convergent element and a divergent element, the convergent element in the convergent doublet being behind the associated divergent element, whilst that in the divergent doublet is in front of the associated divergent element.

3. An anamorphotic attachment as claimed in claim 2, in which the radius of curvature of the internal contact surface in the divergent doublet lies between $\infty$ and $.7f_1$ concave to the front.

4. An anamorphotic attachment as claimed in claim 2, in which the separation between the adjacent nodal points of the two doublets for operative systems is substantially equal to $$\frac{D}{2(D+f_2)} \times [D+2f_2-\sqrt{D^2+4f_1D+4f_1f_2}]$$

where $D$ is the long conjugate distance measured from the front nodal point of the rear doublet.

5. An anamorphotic attachment as claimed in claim 2, including a collimating lens having spherical surfaces which is located in front of the cylindrical doublets and whose focal length is approximately equal to the long conjugate distance measured from the front nodal point of the additional lens, the separation between the adjacent nodal points of the two doublets being fixed and substantially equal to $\Delta$.

6. An anamorphotic attachment as claimed in claim 5, having means for varying the focal length of the collimating lens to accommodate different long conjugate distances.

7. An anamorphotic attachment as claimed in claim 2, having means for varying the separation between the two doublets to accommodate different long conjugate distances.

8. An anamorphotic attachment as claimed in claim 1, in which the convergent doublet consists of a convergent element and a divergent element, the divergent element being located in front of the convergent element and being made of material whose mean refractive index exceeds that of the convergent element by between zero and .22.

9. An anamorphotic attachment as claimed in claim 1, in which the divergent doublet consists of a convergent element and a divergent element, the convergent element being located in front of the divergent element and being made of material whose mean refractive index exceeds that of the divergent element by between .07 and .22.

10. An anamorphotic attachment as claimed in claim 1, in which the radius of curvature of the internal contact surface in the divergent doublet lies between $\infty$ and $.7f_1$ concave to the front.

11. An anamorphotic attachment as claimed in claim 10, in which the separation between the adjacent nodal points of the two doublets for operative systems is substantially equal to $$\frac{D}{2(D+f_2)} \times [D+2f_2-\sqrt{D^2+4f_1D+4f_1f_2}]$$

where $D$ is the long conjugate distance measured from the front nodal point of the rear doublet.

12. An anamorphotic attachment as claimed in claim 10, having means for varying the separation between the two doublets to accommodate different long conjugate distances.

13. An anamorphotic attachment as claimed in claim 1, in which the separation between the adjacent nodal points of the two doublets for operative systems is substantially equal to $$\frac{D}{2(D+f_2)} \times [D+2f_2-\sqrt{D^2+4f_1D+4f_1f_2}]$$

where D is the long conjugate distance measured from the front nodal point of the rear doublet.

14. An anamorphotic attachment as claimed in claim 13, having means for varying the separation between the two doublets to accommodate different long conjugate distances.

References Cited in the file of this patent

UNITED STATES PATENTS

| | | |
|---|---|---|
| 1,829,633 | Chretien | Oct. 27, 1931 |
| 1,829,634 | Chretien | Oct. 27, 1931 |
| 1,932,082 | Newcomer | Oct. 24, 1933 |
| 1,943,172 | Ford | Jan. 9, 1934 |
| 1,945,950 | Newcomer | Feb. 6, 1934 |
| 1,945,951 | Newcomer | Feb. 6, 1934 |
| 1,962,892 | Chretien | June 12, 1934 |
| 2,006,233 | Chretien | June 25, 1935 |
| 2,017,634 | Newcomer | Oct. 15, 1935 |
| 2,048,284 | Newcomer | July 21, 1936 |